United States Patent [19]

Ishikawa et al.

[11] 4,032,202

[45] June 28, 1977

[54] VIBRATION CONTROL BUSH ASSEMBLY

[75] Inventors: Masaru Ishikawa, Toyota; Akihiko Kumazawa, Nagoya, both of Japan

[73] Assignee: Toyota Jidosha Kogyo Kabushiki Kaisha, Toyota, Japan

[22] Filed: Mar. 16, 1976

[21] Appl. No.: 667,285

[30] Foreign Application Priority Data

Mar. 19, 1975 Japan .................. 50-38076[U]

[52] U.S. Cl. ..................... 308/238; 267/57.1 R
[51] Int. Cl.² ............................. F16C 27/00
[58] Field of Search .......... 308/36.1, 237 R, 238; 248/9, 15; 267/57.1 R, 57.1 A, 63 R, 63 A; 280/716, 717

[56] References Cited

UNITED STATES PATENTS

| | | | |
|---|---|---|---|
| 3,130,991 | 4/1964 | Piragino | 308/238 X |
| 3,411,803 | 11/1968 | Melton et al. | 308/238 X |
| 3,481,622 | 12/1969 | van Winsen et al. | 280/716 X |
| 3,971,550 | 7/1976 | Matsuoka et al. | 267/57.1 R |

*Primary Examiner*—Joseph F. Peters, Jr.
*Assistant Examiner*—Gene A. Church
*Attorney, Agent, or Firm*—Stevens, Davis, Miller & Mosher

[57] ABSTRACT

A bush assembly for vibration control, particularly adapted for use in supporting a suspension arm of an automobile suspension system. The bush assembly includes an inner sleeve which is stationarily supported, and an outer sleeve coaxially encircling the inner sleeve and defining a cylindrical clearance space encircling the inner sleeve. The inner and outer sleeves are both separable into a pair of sleeve sections which meet end to end substantially in a common plane. The clearance space is partly filled with a pair of generally cylindrical, primary impact absorbing members which contact the inner and outer sleeves and are disposed symmetrically with respect to the plane in which the inner and outer sleeves are separable into their respective sections. A generally cylindrical, secondary impact absorbing member is interposed between the two primary impact absorbing members and encircles the inner sleeve. The secondary impact absorbing member is smaller in wall thickness than the primary impact absorbing members and contacts one of the inner and outer sleeves, while it is radially spaced from the other. The secondary impact absorbing member includes a layer of material which is less elastic than the material from which the primary impact absorbing members are formed, and therefore, is generally greater in hardness than the primary impact absorbing members.

14 Claims, 6 Drawing Figures

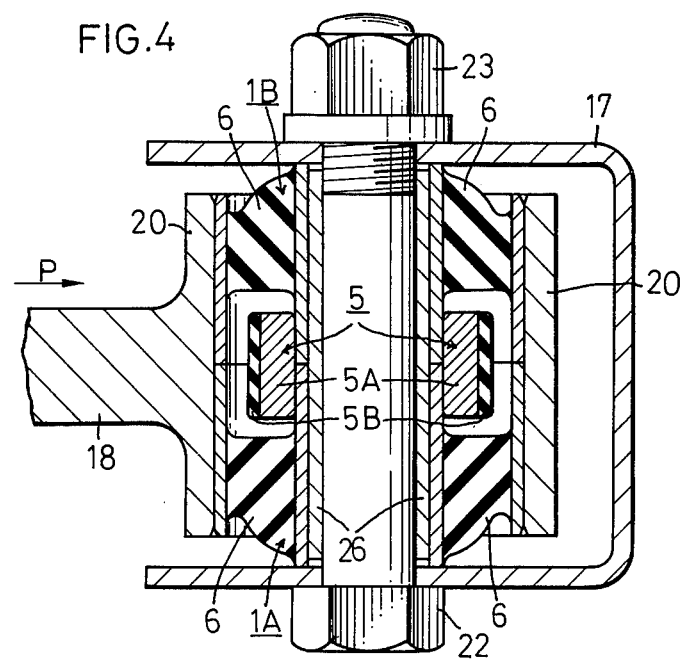
FIG.4
FIG.5
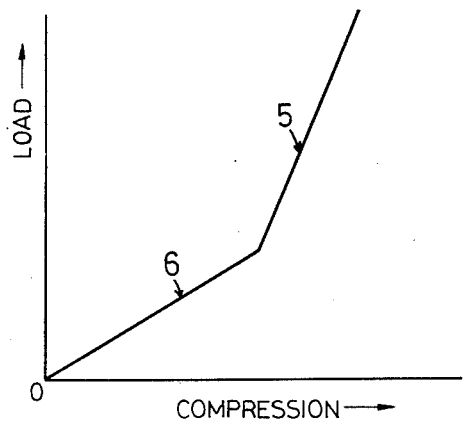
FIG.6
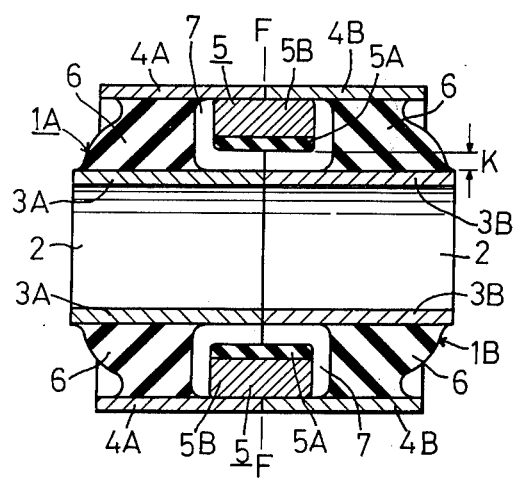

VIBRATION CONTROL BUSH ASSEMBLY

This invention relates to a cylindrical bush or sleeve assembly for vibration control or isolation, and more particularly, to a vibration control bush adapted for use with a suspension arm in an automobile suspension system.

For use with a suspension arm in an automobile suspension system, for example, there is known a vibration control or isolation bush which comprises a hollow cylindrical body made of homogeneous rubber material. The bush is received in an end aperture of the suspension arm and has an axial bore through which an arm mounting pin extends. The bush must be able to damp vibration caused by road irregularities. It must also be capable of enduring repeated application of load due to such vibration. In order to improve the vibration control of such a bush, however, it must be designed so as to have a low spring rate or a greater deflection under a given load, with a resultant reduction in its durability. On the other hand, its durability can be improved only at the sacrifice of its capacity for vibration control because its spring rate must be increased for that purpose. Thus, it has been difficult to obtain a bush which is satisfactory in both its vibration control capacity and durability within a limited dimensional range available for such a bush. In an attempt to provide a solution to that problem, there has been proposed a bush of partly hollow wall construction intended for producing a non-linear spring rate. This bush has also been unsatisfactory because of its failure to provide a desired spring rate and its inferior durability.

It is an object of this invention to provide an improved bush for vibration control having a non-linear spring rate characterized by a relatively large deflection in a small load range and a relatively small deflection in a large load range.

It is another object of this invention to provide an improved bush for vibration control which is capable of effective vibration control over a reasonably long period of time as desired for any paticular application for which it is used.

It is still another object of this invention to provide an improved bush for vibration control having a non-linear spring rate featured by a wide range of variable deflection in a great load area.

It is a further object of this invention to provide an improved bush for vibration control which is easy to manufacture and mount in a selected position.

According to this invention, there is provided a cylindrical bush assembly for vibration control comprising a pair of cylindrical sections which are joined end to end symmetrically with respect to an interface therebetween, and a cylindrical stop member of elastic material secured to the cylindrical sections in the vicinity of the interface therebetween, each of the cylindrical sections being formed by an inner cylinder, and outer cylinder coaxially encircling the inner cylinder and radially spaced apart from the inner cylinder to define a cylindrical clearance space between the inner and outer cylinders, each of which terminates at one end in the interface between the cylindrical sections, and a generally cylindrical impact absorbing member of elastic material partly filling the clearance space and coaxially encircling the inner cylinder, the elastic material of the stop member being generally greater in hardness than that of the impact absorbing member, the impact absorbing members of the cylindrical sections being both recessed from the interface at one end to define a cylindrical hollow space therebetween in which the stop member coaxially encircles the inner cylinders, the stop member having a wall thickness which is smaller than the radial width of the hollow space.

The invention will now be described in further detail by way of example with reference to the accompanying drawings, in which:

FIG. 4 is an enlarged sectional view taken along the line X—X of FIG. 3;

FIG. 5 is a graph showing a typical example of the spring rate obtained by the bush of FIG. 1; and FIG. 6 is a longitudinal sectional view of another embodiment of this invention.

Figure 1:
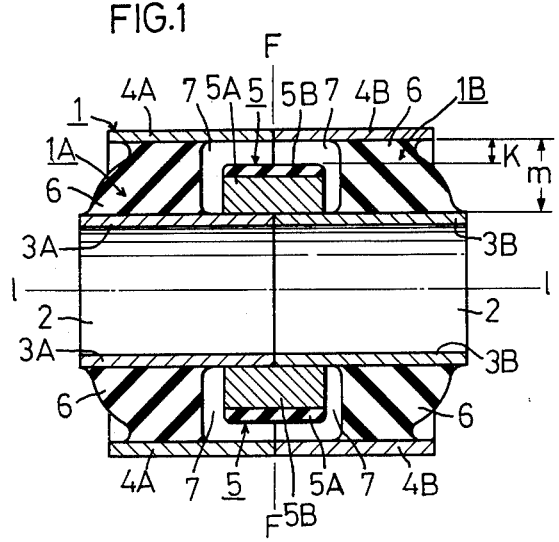
FIG. 1 is a longitudinal sectional view of a preferred embodiment of this invention.

Referring to FIG. 1 of the drawings, there is shown a bush assembly of the double-cylindrical construction, generally indicated at 1, according to a preferred embodiment of this invention. The bush assembly 1 comprises a pair of cylindrical sections 1A and 1B which meet each other end to end symmetrically with respect to an interface F lying in the plane which is transverse to the longitudinal axis of the bush assembly 1. One of the cylindrical sections, indicated at 1A, comprises an inner cylinder 3A made of metal and having an axial bore 2 therethrough, and an outer cylinder 4A made of metal and coaxially encircling the inner cylinder 3A. The outer cylinder 4A is considerably greater in diameter than the inner cylinder 3A and defines a cylindrical clearance space encircling the inner cylinder 3A having a relatively large width as indicated at m. Both the inner and outer cylinders 3A and 4A terminate at one end in the interface F. The outer cylinder 4A is somewhat smaller in length than the inner cylinder 3A and its other end, which is remote from the interface F, falls short of the other end of the inner cylinder 3A.

The cylindrical clearance space between the inner and outer cylinder 3A and 4A is partly filled with a generally cylindrical impact absorbing member 6 made of elastic material, such as rubber, and joined by fusion or otherwise to the inner and outer cylinders 3A and 4A at the inner and outer peripheral surfaces, respectively. The impact absorbing member 6 has at one end a generally flat end face which extends generally in parallel to the interface F and is considerably recessed therefrom. The other end of the impact absorbing member 6, which is remote from the interface F and located in the vicinity of the other ends of the inner and outer cylinders 3A and 4A, defines a tapered surface which is angularly disposed relative to the interface F and which is tapered from the other end of the outer cylinder 4A to that of the inner cylinder 3A.

The other cylindrical section 1B, or the other half of the bush assembly 1, is of the construction which is identical to the first half cylindrical section 1A as is obvious from FIG. 1. The cylindrical section 1B comprises an inner cylinder 3B which meets end to end with the inner cylinder 3A, an outer cylinder 4B which meets end to end with the outer cylinder 4A, and an impact absorbing member 6 positioned symmetrically to the impact absorbing member 6 of the first half cylindrical section 1A with respect to the interface F. The two impact absorbing members 6 define therebetween a cylindrical hollow space 7 located in the plane of the interface F and encircling the two inner cylinders 3A and 4A. The hollow space 7 accommodates a cylindrical stop member 5 made of elastic material and fitting around the inner cylinders 3A and 3B in the plane of the interface F. The stop member 5 is substantially equally spaced from the impact absorbing members 6 and the inner surfaces of the outer cylinders 4A and 4B define a cylindrical clearance K encircling the stop member 5.

The stop member 5 is formed by an inner cylindrical layer 5A inserted over the mating ends of the inner cylinders 3A and 3B and an outer cylindrical layer 5B encircling and secured to the inner layer 5A. The inner layer 5A is considerably greater in wall thickness than the outer layer 5B and is formed from material which is less elastic or greater in hardness than what the outer layer 5B is formed from. Thus, the inner and outer layers 5A and 5B have a combined modulus of elasticity which is greater than that of the impact absorbing member 6. The inner layer 5A may be made of hard rubber, plastics, preferably those used for the manufacture of bearings, or metal. The outer layer 5B may be formed from soft rubber, soft plastics or like material. The inner and outer layers 5A and 5B may be joined together by fusion or adhesion.

Figure 2:
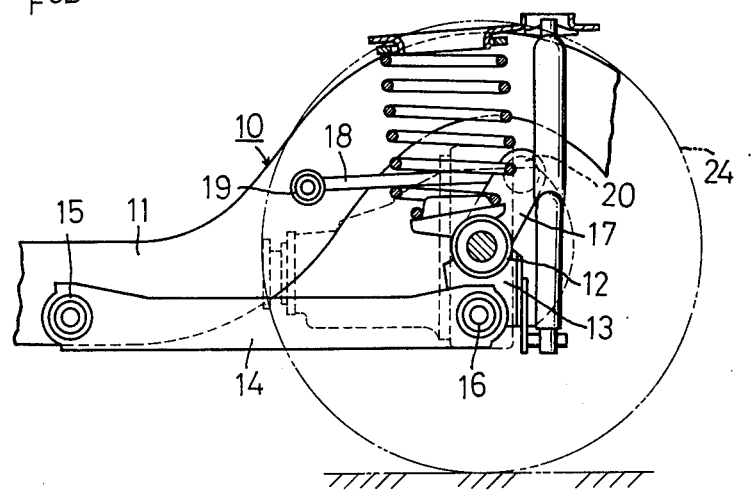
FIG. 2 is a fragmentary, diagrammatic illustration of a rear suspension system of an automobile in which the bush of FIG. 1 is mounted.
Figure 3:
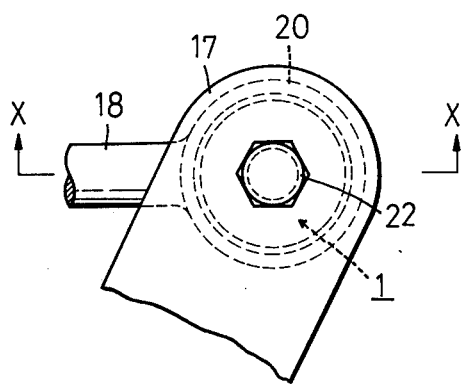
FIG. 3 is a fragmentary, enlarged view of FIG. 2, illustrating the bush applied to one end of a suspension arm.

Attention is now directed to FIG. 2 illustrating a typical example of application of the vibration control bush according to this invention. FIG. 2 fragmentarily shows a rear suspension system 10 of an automobile which includes a lower suspension arm 14 carried at one end 15 on a frame 11 and supported at the other end 16 by a bracket 13 on an axle housing 12, and an upper suspension arm 18 having opposite ends 19 and 20 supported respectively by the frame 11 and another bracket 17 on the axle housing 12. FIGS. 2 through 4 illustrate a bush assembly 1 applied to one end 20 of the upper suspension arm 18, while a similar bush assembly may be equally used at the other end 19, as well as each of the opposite ends 15 and 16 of the lower suspension arm 14.

In order to mount the bush assembly 1 in position at the end 20 of the upper suspension arm 18, one starts with the bush assembly 1 in its disassembled condition. The stop member 5 is inserted over one end of the inner cylinder 3A of the first half cylindrical section 1A. The cylindrical section 1A is inserted into one end of an aperture formed at the end 20 of the upper suspension arm 18 and having a longitudinal axis which is generally perpendicular to the longitudinal axis of the arm 18. The second half cylindrical section 1B is inserted into the end aperture of the arm 18 through the other end thereof to insert the inner cylinder 3B into the stop member 5 until the inner and outer cylinders 3B and 4B abut against the inner and outer cylinders 3A and 4A, respectively, of the first half cylindrical section 1A as illustrated in FIGS. 1 and 4. Then, in order to connect the end 20 of the upper suspension arm 18 with the axle housing bracket 17 in such a manner that the former may be enclosed by the latter as illustrated in FIG. 4, a cylindrical collar 26 is inserted into the longitudinally aligned axial bores 2 of the inner cylinders 3A and 3B, and a bolt 22 extending through the collar 26 and a nut 23 tightening the bolt 22 against the bracket 17 provide a secure support for the arm end 20 and the bush assembly 1 mounted thereon relative to the bracket 17.

If a large impact is applied to a rear wheel 24 (FIG. 2) by road irregularities or otherwise and transmitted to the upper suspension arm 18, the upper suspension arm 18 may be caused to move in the direction indicated by an arrow P in FIG. 4. The arm 18 displaces the outer cylinders 4A and 4B transversely or to the right in FIG. 4 and compresses against the inner cylinders 3A and 3B those portions of the impact absorbing members 6 which appear on the left-hand side of FIG. 4, so that at least a part of the impact may be damped. If the impact transmitted to the arm 18 is greater than the impact absorbing members 6 can effectively absorb, the outer cylinders 4A and 4B are further displaced in the direction of the arrow P and the impact absorbing members 6 are elastically deformed to a further extent because of their relatively small modulus of elasticity until the outer cylinders 4A and 4B abut against the stop member 5 on the left-hand side of FIG. 4 and compress the left-hand portion of the stop member 5 against the inner cylinders 3A and 3B. The stop member 5 manifests a stronger damping effect than the impact absorbing members 6 because of its greater modulus of elasticity. Upon abutment of the outer cylinders 4A and 4B against the stop member 5, the stop member 5 and the impact absorbing members 6 cooperate with each other in damping the impact through their elastic deformation or compression proportional to their combined moduli of elasticity. This relationship is typically represented in the graph FIG. 5 which illustrates a typical relationship between the impact or load and the compression or deflection known as "spring rate" which the bush assembly of this invention can show. The first half or lower portion of the curve illustrates the relationship between the load applied to the impact absorbing members 6 and the resultant compression thereof during the initial phase of operation of the bush assembly, whereas the upper portion plots a combined load-compression relationship for the stop member 5 and the impact absorbing members 6 during the final phase of operation. It will be noted that the outer layer 5B which is formed from more elastic material than the inner layer 5A provides an effective cushion against any undesirable shock that may be generated upon abutment of the outer cylinders 4A and 4B against the stop member 5.

The impact absorbing members 6 or they and the stop member 5 restore their original shapes when the impact on the rear wheel 24 ceases to exist.

It will be observed that the collar 26 interposed between the bush assembly 1 and the bolt 22 will serve to prevent centralized transmission of load to the bolt 22 with a resultant reduction in the strength thereof.

Referring now to FIG. 6 of the drawings in which like numerals indicate like parts throughout all the figures, there is shown a modified form of the bush assembly according to this invention. The only difference between the bush assembly of FIG. 1 and that of FIG. 6 resides in the position and structure of the stop member 5 as is obvious from FIG. 6. In the assembly of FIG. 6, the stop member 5 is secured to the inner surfaces of outer cylinders 4A and 4B and is radially spaced apart from inner cylinders 3A and 3B to define a cylindrical clearance K encircling the inner cylinders 3A and 3B in the plane of an interface F between a pair of symmetrically joined cylindrical sections 1A and 1B. The stop member 5 is again of the double-layered cylindrical construction, but is distinguished from the counterpart in FIG. 1 in that its inner layer 5A is considerably smaller in wall thickness than its outer layer 5B and is formed from material which is smaller in hardness or more elastic than what the outer layer 5B is made of. Irrespective of such positional and structural differences, however, the bush assembly of FIG. 6 will work as satisfactorily as that of FIG. 1 in the same fashion as hereinbefore described in connection with the latter.

It will be appreciated from the foregoing description and the accompanying drawings that this invention essentially includes a pair of mutually spaced primary impact absorbing members and a secondary impact absorbing member interposed between the primary impact absorbing members in a position recessed inwardly therefrom and formed from material which is generally less elastic than the material of the primary impact absorbing members, whereby any impact to be damped by the device of this invention is initially borne by the primary impact absorbing members and the secondary member cooperates to damp any load in excess of what the primary members can effectively absorb. Thus, the vibration control bush assembly of this invention has a non-linear spring rate as typically shown in FIG. 5 and can effectively control any vibration caused by road irregularities or otherwise to maintain an optimum riding comfort and handling qualities of an automobile.

While the invention has been described with reference to a couple of forms of embodiment, it is to be understood that further modifications or variations may be easily made by those skilled in the art without departing from the scope of this invention which is defined by the appended claims.

What is claimed is:

1. A cylindrical bush assembly for vibration control comprising a pair of cylindrical sections which are joined end to end symmetrically with respect to an interface therebetween, and a cylindrical stop member of elastic material coaxially secured to said cylindrical sections in the vicinity of said interface, each of said cylindrical sections being formed by an inner cylinder, an outer cylinder coaxially encircling said inner cylinder and radially spaced apart from said inner cylinder to define a cylindrical clearance space between said inner and outer cylinders, each of which terminates at one end in said interface, and a generally cylindrical impact absorbing member of elastic material partly filling said clearance space and coaxially encircling said inner cylinder, said elastic material of said stop member being generally greater in hardness than that of said impact absorbing member, said impact absorbing members of said cylindrical sections being both recessed from said interface at one end to define a cylindrical hollow space therebetween in which said stop member coaxially encircles said inner cylinders, said stop member having a wall thickness which is smaller than the radial width of said hollow space.

2. The invention as defined in claim 1 wherein said stop member comprises at least two cylindrical layers placed one upon another and formed from different elastic material of different hardness from one another.

3. The invention as defined in claim 1 wherein said stop member encircles said inner cylinders in close contact therewith to define a cylindrical clearance forming a part of said hollow space and encircling said stop member.

4. The invention as defined in claim 3 wherein said stop member comprises an inner cylindrical layer and an outer cylindrical layer formed from material which is more elastic than the material from which said inner layer is formed.

5. The invention as defined in claim 1 wherein said stop member encircles said inner cylinders in close contact with said outer cylinders to define a cylindrical clearance forming a part of said hollow space and encircling said inner cylinders.

6. The invention as defined in claim 5 wherein said stop member comprises an inner cylindrical layer and an outer cylindrical layer contacting said outer cylinders, said inner layer being formed from material which is more elastic than the material from which said outer layer is formed.

7. The invention as defined in claim 1 wherein said stop member has a pair of opposite end faces each spaced from said one end of one of said impact absorbing members to define a cylindrical clearance forming a part of said hollow space and encircling one of said inner cylinders.

8. A bush assembly for vibration control adapted to resiliently support one end of a suspension arm of an automobile suspension system, and comprising:
an inner cylindrical sleeve adapted to be supported stationarily relative to an axle housing;
an outer cylindrical sleeve encircling said inner sleeve and radially spaced equal distance therefrom to define a cylindrical clearance space encircling said inner sleeve, said outer sleeve being transversely displaceable relative to said inner sleeve, while being stationarily held relative to said one end of said suspension arm;
a pair of generally cylindrical, primary impact absorbing members of elastic material contacting said inner and outer sleeves and partly filling said clearance space to define a hollow space therebetween encircling said inner sleeve; and
a generally cylindrical, secondary impact absorbing member displaced in said hollow space and coaxially encircling said inner sleeve, said secondary impact absorbing member having a wall thickness which is smaller than the radial width of said hollow space and being formed from elastic material which is greater in hardness than said elastic material of said primary impact absorbing members.

9. The invention as defined in claim 8 wherein said inner and outer sleeves are each separable into a pair of cylindrical sleeve sections of substantially equal length which meet end to end, said sleeve sections of said outer sleeve meeting each other substantially in a plane in which said sleeve sections of said inner sleeve meet each other, said secondary impact absorbing member lying substantially in said plane and providing means for holding said sleeve sections of said inner and outer sleeves together.

10. The invention as defined in claim 9 wherein said secondary impact absorbing member comprises an inner cylindrical layer of elastic material and an outer cylindrical layer placed around said inner layer in contact therewith and formed from different elastic material from said elastic material of said inner layer.

11. The invention as defined in claim 10 wherein said inner layer contacts said sleeve sections of said inner sleeve and is greater in wall thickness than said outer layer, said outer layer being radially inwardly spaced from said outer sleeve and formed from material which is more elastic than said elastic material of said inner layer.

12. The invention as defined in claim 10 wherein said outer layer contacts said sleeve sections of said outer sleeve and is greater in wall thickness than said inner layer, said inner layer being radially outwardly spaced from said inner sleeve and formed from material which is more elastic than said elastic material of said outer layer.

13. The invention as defined in claim 11 wherein said elastic material of said outer layer is the same as said elastic material of said primary impact absorbing members.

14. The invention as defined in claim 12 wherein said elastic material of said inner layer is the same as said elastic material of said primary impact absorbing members.

* * * * *